(12) United States Patent
Schmidt

(10) Patent No.: US 11,447,315 B2
(45) Date of Patent: Sep. 20, 2022

(54) CO-EXTRUDED PLASTICIZED PVC-BASED PACKAGING FILMS AND METHOD FOR ITS PRODUCTION

(71) Applicants: Waldemar Vladimir Schmidt, Speyer (DE); Natalya Schmidt, Speyer (DE)

(72) Inventor: Waldemar Vladimir Schmidt, Speyer (DE)

(73) Assignee: Waldemar Vladimir Schmidt, Speyer (DE)

( * ) Notice: Subject to any disclaimer, the term of this patent is extended or adjusted under 35 U.S.C. 154(b) by 136 days.

(21) Appl. No.: 16/051,681

(22) Filed: Aug. 1, 2018

(65) Prior Publication Data

US 2018/0339824 A1 Nov. 29, 2018

Related U.S. Application Data

(63) Continuation-in-part of application No. PCT/EP2017/079737, filed on Nov. 20, 2017.

(30) Foreign Application Priority Data

Nov. 25, 2016 (DE) ...................... 10 2016 122 818.4

(51) Int. Cl.
  *B32B 27/08* (2006.01)
  *B32B 27/30* (2006.01)
  (Continued)

(52) U.S. Cl.
  CPC .............. *B65D 65/40* (2013.01); *B32B 25/08* (2013.01); *B32B 27/08* (2013.01); *B32B 27/304* (2013.01);
  (Continued)

(58) Field of Classification Search
  CPC ....... B32B 27/22; B32B 27/304; B32B 27/08; B29C 48/00–965
  See application file for complete search history.

(56) References Cited

U.S. PATENT DOCUMENTS

| 4,320,175 A | * | 3/1982 | Hisazumi | ................ B32B 27/30 |
| | | | | 428/518 |
| 4,959,269 A | | 9/1990 | Dehennau | |

(Continued)

FOREIGN PATENT DOCUMENTS

| DE | 2839083 A1 | 3/1979 |
| DE | 19503326 A1 | 8/1996 |

(Continued)

OTHER PUBLICATIONS

Coltro, et al. Migration of conventional and new plasticizers from PVC films into food simulants: A comparative study. Food Control, 2014, 44, 118-129. (Year: 2014).*

(Continued)

*Primary Examiner* — Stephen E Rieth
(74) *Attorney, Agent, or Firm* — Ditthavong, Steiner & Mlotkowski

(57) ABSTRACT

This invention relates to a method for the production of a co-extruded plasticized multi-layer PVC packaging film that consists of polyvinyl chloride (PVC), polyvinylidene chloride (PVDC), a combination that consists of polyvinyl chloride (PVC) and polyvinylidene chloride (PVDC) or other thermoplastics or elastomers that can be co-polymerized with PVC, having a plasticizer migration behavior from the film composite, which is reduced compared to comparable mono-layer plasticized PVC films and is maximally restricted to 40 mg/dm$^2$. The invention also relates to a co-extruded plasticized multi-layer PVC packaging film that consists of polyvinyl chloride (PVC), polyvinylidene chloride (PVDC), a combination that consists of polyvinyl chloride (PVC) and polyvinylidene chloride (PVDC) or other thermoplastics or elastomers that can be co-polymerized with PVC, having a plasticizer migration behavior from the film composite, which is reduced compared to compa- (Continued)

Figure 7:
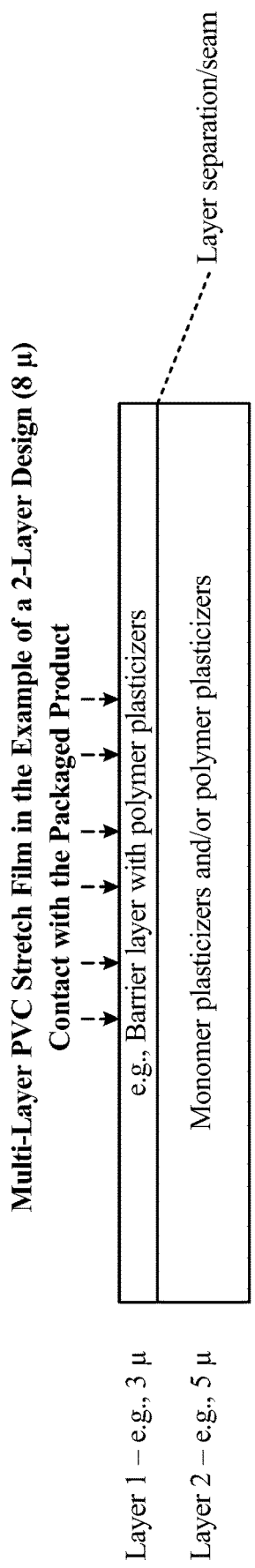

Multi-Layer PVC Wrap Film in the Example of a 7-Layer Design (12 μ)
Contact with the Packaged Product

| | |
|---|---|
| Layer 1 – e.g., 1 μ | e.g., Fewer plasticizers; monomer plasticizers and/or polymer plasticizers |
| Layer 2 – e.g., 1 μ | e.g., Barrier layer with monomer plasticizers and/or polymer plasticizers |
| Layer 3 – e.g., 1 μ | e.g., Barrier layer with monomer plasticizers and/or polymer plasticizers |
| Layer 4 – e.g., 1.5 μ | e.g., Barrier layer with polymer plasticizers |
| Layer 5 – e.g., 1.5 μ | e.g., Monomer plasticizers |
| Layer 6 – e.g., 2 μ | e.g., Monomer plasticizers |
| Layer 7 – e.g., 4 μ | e.g., Monomer plasticizers |

→ Layer separation/seam rable plasticized mono-layer PVC films and is maximally restricted to 40 mg/dm².

5 Claims, 6 Drawing Sheets

(51) Int. Cl.
  *C08K 5/00* (2006.01)
  *B32B 25/08* (2006.01)
  *C08J 3/18* (2006.01)
  *C08J 5/18* (2006.01)
  *B65D 65/40* (2006.01)
(52) U.S. Cl.
  CPC . *C08J 3/18* (2013.01); *C08J 5/18* (2013.01); *C08K 5/0016* (2013.01); *B32B 2250/24* (2013.01); *B32B 2250/246* (2013.01); *B32B 2264/00* (2013.01); *B32B 2264/12* (2013.01); *B32B 2270/00* (2013.01); *B32B 2307/7242* (2013.01); *B32B 2307/732* (2013.01); *B32B 2439/70* (2013.01); *C08J 2327/06* (2013.01); *C08J 2327/08* (2013.01)

(56) References Cited

U.S. PATENT DOCUMENTS

| | | |
|---|---|---|
| 2010/0310891 A1 | 12/2010 | Godwin |
| 2012/0207887 A1* | 8/2012 | Battersby ............ C09D 193/02 426/127 |
| 2013/0225737 A1 | 8/2013 | Gosse et al. |
| 2016/0276105 A1 | 9/2016 | Qi et al. |

FOREIGN PATENT DOCUMENTS

| | | | |
|---|---|---|---|
| DE | 19650573 | A1 | 5/1997 |
| DE | 19621688 | A1 | 12/1997 |
| DE | 19704275 | A1 | 8/1998 |
| DE | 102004000023 | A1 | 2/2006 |
| DE | 102005009664 | A1 | 9/2006 |
| DE | 102006031841 | A1 | 1/2008 |
| DE | 102010047881 | A1 | 4/2012 |
| EP | 0807132 | B1 | 4/2002 |
| FR | 2686887 | A3 | 8/1993 |
| FR | 2691436 | A1 | 11/1993 |
| GB | 2043533 | A | 10/1980 |
| WO | WO-0136194 | A1 * | 5/2001 ........ B32B 27/304 |
| WO | 2011110567 | A1 | 9/2011 |
| WO | 2012026861 | A1 | 3/2012 |

OTHER PUBLICATIONS

Reinecke, et al. Plasticizers. Encyclopedia of Polymer Science and Technology. John Wiley & Sons. 2011. (Year: 2011).*

Xiong, L. et al. Plasticizer migration from micro-layered flexible poly (vinyl chloride) films prepared by multi-layer co-extrusion technology. Journal of Plastic Film & Sheeting, 2016, 32, 402-418. Published online Oct. 21, 2015. (Year: 2015).*

Lee, P. C. et al. Experimental and numerical analysis of micro/nanolayer coextrusion. Journal of Plastic Film & Sheeting, 2012, 29, 78-98. Published online Jul. 18, 2012. (Year: 2012).*

English translation of International Search Report issued in International Application No. PCT/EP2017/079737, dated Feb. 16, 2018.

* cited by examiner

Multi-Layer PVC Stretch Film in the Example of a 7-Layer Design (14 μ)

| Layer | Thickness | Description |
|---|---|---|
| Layer 1 | e.g., 1 μ | e.g., Barrier layer with monomer plasticizers and/or polymer plasticizers |
| Layer 2 | e.g., 1 μ | e.g., Barrier layer with monomer plasticizers and/or polymer plasticizers |
| Layer 3 | e.g., 1 μ | e.g., Barrier layer with polymer plasticizers |
| Layer 4 | e.g., 8 μ | e.g., Monomer plasticizers |
| Layer 5 | e.g., 1 μ | e.g., Barrier layer with polymer plasticizers |
| Layer 6 | e.g., 1 μ | e.g., Barrier layer with monomer plasticizers and/or polymer plasticizers |
| Layer 7 | e.g., 1 μ | e.g., Barrier layer with monomer plasticizers and/or polymer plasticizers |

Layer separation/seam

*FIG. 1*

Multi-Layer PVC Wrap Film in the Example of a 7-Layer Design (12 μ) Contact with the Packaged Product

| Layer | Thickness | Description |
|---|---|---|
| Layer 1 | e.g., 1 μ | e.g., Fewer plasticizers; monomer plasticizers and/or polymer plasticizers |
| Layer 2 | e.g., 1 μ | e.g., Barrier layer with monomer plasticizers and/or polymer plasticizers |
| Layer 3 | e.g., 1 μ | e.g., Barrier layer with monomer plasticizers and/or polymer plasticizers |
| Layer 4 | e.g., 1.5 μ | e.g., Barrier layer with polymer plasticizers |
| Layer 5 | e.g., 1.5 μ | e.g., Monomer plasticizers |
| Layer 6 | e.g., 2 μ | e.g., Monomer plasticizers |
| Layer 7 | e.g., 4 μ | e.g., Monomer plasticizers |

Layer separation/seam

*FIG. 2*

Multi-Layer PVC Stretch Film in the Example of a 3-Layer Design (8 μ)

| | |
|---|---|
| Layer 1 – e.g., 1.5 μ | e.g., Barrier layer with polymer plasticizers |
| Layer 2 – e.g., 5 μ | Monomer plasticizers and/or polymer plasticizers |
| Layer 3 – e.g., 1.5 μ | e.g., Barrier layer with polymer plasticizers |

Layer separation/seam

*FIG. 3*

Multi-Layer PVC Wrap Film in the Example of a 5-Layer Design (10 μ)

| | |
|---|---|
| Layer 1 – e.g., 1 μ | e.g., Barrier layer with polymer plasticizers |
| Layer 2 – e.g., 1.5 μ | e.g., Fewer plasticizers; monomer plasticizers and/or polymer plasticizers |
| Layer 3 – e.g., 5 μ | Monomer plasticizers and/or polymer plasticizers; Optionally fewer plasticizers altogether |
| Layer 4 – e.g., 1.5 μ | e.g., Fewer plasticizers; monomer plasticizers and/or polymer plasticizers |
| Layer 5 – e.g., 1 μ | e.g., Barrier layer with polymer plasticizers |

Layer separation/seam

*FIG. 4*

Multi-Layer PVC Stretch Film in the Example of a 3-Layer Design (7 μ)

| | |
|---|---|
| Layer 1 – e.g., 1.5 μ | e.g., Barrier layer with polymer plasticizers |
| Layer 2 – e.g., 4 μ | e.g., Monomer plasticizers |
| Layer 3 – e.g., 1.5 μ | e.g., Barrier layer with polymer plasticizers |

Layer separation/seam

*FIG. 5*

Multi-Layer PVC Wrap Film in the Example of a 9-Layer Design (16 μ)

| | |
|---|---|
| Layer 1 – e.g., 1 μ | e.g., As little plasticizer (polymer) as possible |
| Layer 2 – e.g., 1.5 μ | e.g., Barrier layer with polymer plasticizers |
| Layer 3 – e.g., 1.5 μ | e.g., Monomer plasticizers and/or polymer plasticizers |
| Layer 4 – e.g., 1.5 μ | e.g., Monomer plasticizers and polymer plasticizers |
| Layer 5 – e.g., 5 μ | e.g., Monomer plasticizers |
| Layer 6 – e.g., 1.5 μ | e.g., Monomer plasticizers and polymer plasticizers |
| Layer 7 – e.g., 1.5 μ | e.g., Monomer plasticizers and/or polymer plasticizers |
| Layer 8 – e.g., 1.5 μ | e.g., Barrier layer with polymer plasticizers |
| Layer 9 – e.g., 1 μ | e.g., As little plasticizer (polymer) as possible |

Layer separation/seam

*FIG. 6*

CO-EXTRUDED PLASTICIZED PVC-BASED PACKAGING FILMS AND METHOD FOR ITS PRODUCTION

CROSS REFERENCE TO RELATED APPLICATIONS

This application claims benefit of priority to German Patent Application No. 10 5016 122 818.4 filed Nov. 25, 2016, and to International Patent Application No. PCT/EP2017/079737 filed on Nov. 20, 2017, the contents of which are hereby incorporated herein by reference in their entirety.

FIELD

This invention relates to a method for the production of a co-extruded plasticized multi-layer food packaging film that consists of polyvinyl chloride (PVC), a combination that consists of polyvinyl chloride (PVC) and polyvinylidene chloride (PVDC) or other thermoplastics or elastomers that can be co-polymerized with PVC, having a proportion of plasticizer migration, which is reduced compared to plasticized mono-layer PVC films and is restricted to 40 mg/dm$^2$, into food. The invention also relates to a co-extruded plasticized multi-layer food packaging film that consists of polyvinyl chloride (PVC), a combination that consists of polyvinyl chloride (PVC) and polyvinylidene chloride (PVDC) or other thermoplastics or elastomers that can be co-polymerized with PVC, having a proportion of plasticizer migration, which is reduced compared to plasticized mono-layer PVC films and is restricted to 40 mg/dm$^2$, into food.

BACKGROUND

For packaging foods, i.a., polyvinyl chloride (PVC) plastic wraps are used, in whose production a large number of plasticizers can be used. In food packaging, plasticized PVC is problematic, since the plasticizers that are used (in varying intensity) migrate from the film into the packaged food. This applies in particular for fatty foods and substances, since fat has a high absorbing capacity for plasticizers. The frequently-used plasticizer DEHA (diethylhexyl adipate) is classified as a carcinogen and can, moreover, affect embryonic development by disrupted osteogenesis or organ malformations.

Mono-layers in the case of food plastic wraps are known, for example, from DD 234431 A1, in which a self-adhesive and stretchable plastic wrap was developed with a thickness of 0.010 to 0.020 mm. The film composition contains ethylene-vinyl acetate-co-polymerizate, low-molecular polyethylene, an ester, as well as optionally partially-oxidized low-molecular polyethylene.

FR 2686887 A1 and FR 2691436 A1 describe the production of stretch films from a mixture of styrene-butadiene-styrene block co-polymers and a styrene-butadiene rubber as a plasticizer phase, which can also contain polyisobutylene. These films have a good "memory effect" and can be produced in a self-adhesive manner. EP 0 807 132 B1 also describes a similarly-constituted film. Additional films based on a styrene polymerizate for application as food packaging are described in DE 195 03 326 A1, DE 196 21 688 A1, and DE 197 04 275 A1. DE 10 2005 009 664 A1 describes a multi-layer composite system that consists of ethylene/vinyl acetate co-polymerizates as adhesives, which consist of two or more films that are constituted in various ways chemically and with low adhesion, and an adhesive based on ethylene/vinyl acetate co-polymerizates. The multi-layer composite system that is described there is used for the production of molded elements (e.g., food boxes), which are resealable.

A multi-layer film that consists of thermoplastic polymers is described in DE 10 2006 031 841 A1, which does not require laminating adhesives.

A multi-layer blown film, which is produced by means of co-extrusion, is described in DE 196 50 573 B4, whereby here also, a polypropylene co-polymer is used, which is mixed with a styrene-ethylene-butylene block co-polymer or a styrene-ethylene-propylene block co-polymer, by which a rubber-modified polypropylene-random co-polymer is obtained.

PVC stretch films have heretofore been produced using, i.a., plasticizers, only as mono-films (produced via a mono-extrusion) for food packaging (for example, as food film or plastic wrap). In this case, a cast-film extrusion or a blown-film extrusion is used.

In EU Directive October 2011, European regulations and instructions for plastic packaging for food are summarized. In this connection, i.a., test methods for determining migration behavior are described, and products are divided into groups. Thus, high-fat products, such as, e.g., marinated or pickled meats, should be packaged only with (PVC) films with a reduction factor of 1, while fresh meat should be packaged, e.g., with films that have a correction factor or reduction factor of 4.

The following applies: the smaller the migration values, the lower the necessary reduction factor that is required to meet the specifications of the above-mentioned EU directive.

Higher reduction factors for meeting the specifications of the directive accordingly correspond to higher migration values for plasticizers, which can potentially contaminate the packaged food.

As specific migration (SML=Specific Migration Limit) for the plasticizer DEHA (diethylhexyl adipate), the ordinance stipulates a boundary value of a maximum of 18 mg per kilogram of packaged food (corresponds to 18 mg/6 dm$^2$ film, and thus 3 mg/dm$^2$ film). As overall migration (i.e., migration of plasticizers in total, including the plasticizer DEHA), a boundary value of a maximum of 60 mg per kilogram (corresponds to 60 mg/6 dm$^2$ film, and thus 10 mg/dm$^2$ film) applies to packaged food.

If, for example, the migration values of a 1 dm$^2$-sized piece of PVC plastic wrap is tested according to the specifications of EU Directive October 2011, and in this case a migration of, e.g., 27 mg is obtained, in this case this is a so-called factor-3 film, since the value must be divided by the factor of 3 in order to get to a value of no more than 10 mg/dm$^2$.

This means that with the tested film, the only foods that should be packaged are those that are specified in EU Directive October 2011 with a factor of 3 or higher (e.g., reduction factor of 4). This film, for example, should not be used for marinated/pickled meat.

Raw, unprocessed vegetables, e.g., have no reduction factor because of the lack of a fat portion. Thus, there is no limitation in migration here.

To date, PVC films with a reduction of 1 are possible and available in the food industry. In the case of these films, i.a., very expensive polymers or high-molecular plasticizers are used. Polymer plasticizers have a considerably lower migration tendency than monomer plasticizers or low-molecular plasticizers. The use of polymer plasticizers is, however, problematic to the extent that with an increasing proportion of polymer plasticizers, the film becomes stiffer and less elastic and simultaneously considerably more expensive than in the case of monomer plasticizers. This means that a suitable mixture that consists of polymer plasticizers and monomer plasticizers that migrate as little as possible must be found in order to configure the film in a manner that is both economical and technically rational, functioning and feasible. At the same time, the film must be kept very thin, so that the overall and (if relevant) also the specific migration boundaries can be maintained in order to achieve a reduction factor of 1. As a result, the problem arises that the films with a reduction factor of 1 that are now available are suitable almost solely for manual applications. For machine processing, thicker films and/or more elastic films are required. These have in turn higher migration values and thus higher reduction factors or are economically and/or technically unusable for the purpose that is set forth. Available plasticized PVC stretch films have the following factor thresholds taking into consideration the above-mentioned technical usability and economical feasibility:

Factor of 1 (migration of $\leq 10$ mg/dm$^2$)=up to approximately 7μ (0.007 mm) of thickness, Factor of 2 (migration of $\leq 20$ mg/dm$^2$)=up to approximately 10μ (0.010 mm) of thickness, Factor of 3 (migration of $\leq 30$ mg/dm$^2$)=up to approximately 14μ (0.014 mm) of thickness, Factor of 4 (migration of $\leq 40$ mg/dm$^2$)=up to approximately 18μ (0.018 mm) of thickness. These thresholds represent only approximate values. By using polymer plasticizers, the migration values can be reduced. Thus, for example, the factor of 4 is still possible with a 20μ film.

The use of polymer plasticizers has in practice, however, significant limitations. Thus, the film is more viscous and cannot be stretched as well. In addition, polymer plasticizers are very expensive and are making the film more and more disadvantageous for customers and ultimately are pricing themselves out of the market. The film is thus becoming more expensive, its use as stretch film is becoming more problematic, and it is resulting in customers incurring higher maintenance costs at the packaging plants. A PVC stretch film that is usable and marketable corresponding to the application cannot be produced at this time, for example, in 14μ with a factor of 2. If it is desired to produce, for example, a factor-2 film using a 5-layer design, the individual layers are very thin. In the current state of the art, the extrusion of plasticized PVC films, which are thinner than 7μ, is already a serious challenge. With thin plasticized PVC films ($\leq$approximately 8μ), the formations of folds when winding up the film onto the roll after the extrusion is occurring more and more frequently. Even if the formation of folds when the film is being wound up in the production process is prevented, the latter are difficult to avoid in the case of further processing. This makes technology other than co-extrusion (e.g., all types of lining or laminating) technically unfeasible for the production of thinner plasticized multi-layer PVC films.

Co-extruded food packaging films with plasticizer portions are known in the art. DE2839083A1 thus describes, i.a., a co-extruded food packaging material, which consists of two different layers, whereby one layer consists of vinylidene chloride co-polymer and a low-molecular plasticizer, and the other layer (supporting layer) consists of homopolymers or co-polymers of vinyl chloride with an organic additive, namely functional oligomers, fats and oils, colophonium and derivatives thereof.

US2016/0276105 also describes a method for the production of a multi-layer co-extruded and/or laminated packaging film, for example that also consists of polyvinyl chloride. With the method, a melt that consists of polyvinyl chloride as well as one or more plasticizer(s) can be prepared, from which at least two film layers are produced.

DE10 2004 000 023 A1 describes a method for the production of multi-layer laminated films, for example that also consist of polyvinyl chloride. The partial films that are used can contain various plasticizers, plasticizer mixtures and/or plasticizer portions. Because of the diffusion-driven movement of plasticizers between at least two partial films that are in contact with one another, an end state arises that has plasticizer contents other than in the state before contact production.

US2010/0310891A1 describes the production of a film for use, i.a., as a food packaging film, consisting of polyvinyl chloride with at least one plasticizer, whereby the plasticizer is an ester of a cyclohexanecarboxylic acid. This film can be produced by means of extrusion.

SUMMARY

Against this background, the object of this invention is to produce an improved, plasticized multi-layer PVC packaging film, in which the migration of plasticizers out of the film is considerably reduced or inhibited under otherwise identical conditions in order not to exceed an overall proportion of the migrating plasticizers (overall migration) of 40 mg/dm$^2$ or to be able to achieve migration results with thicker films, which were previously technically or economically unfeasible.

This object is achieved by a co-extruded plasticized multi-layer PVC packaging film according to this invention as well as a method for its production.

Preferred plasticized PVC packaging films according to the present invention are food packaging films. Preferably the migration of plasticizers from the packaging film into the food to be packaged is reduced or inhibited by the present invention.

DETAILED DESCRIPTION

This invention is based on the observation that plasticizers from a PVC film layer can migrate through another PVC film layer from the film composite. In order to slow down the migration of plasticizers from the film or to reduce it to a very large extent, it is proposed according to the invention that the plasticized PVC packaging film be made by building up a co-extruded, multi-layer film. According to the invention, PVC, PVDC, combinations thereof and/or another PVC-co-polymerizable thermoplastic or elastomer is/are used.

The overall proportion of the migrating plasticizers (overall migration) from the film is not to exceed 40 mg/dm$^2$, preferably 10 mg/dm$^2$. In a preferred variant, a reduction factor of 1 ($\leq 10$ mg/dm$^2$) is achieved and makes the film that is produced according to the invention universally usable as packaging material, preferably for food. At the same time, the film is technically suitable/usable and economically rational/feasible for all current manual and machine applications.

In the production of thin, plasticized PVC films (plastic wraps and stretch films), co-extrusion has not been used up until now and thus does not correspond to the state of the art in this area. At the same time, the production of the film according to the invention is possible solely by co-extrusion. To be able to maintain an overall migration boundary of a maximum of 40 mg/dm$^2$ even with thicker plasticized PVC films or to achieve smaller migration values compared to comparable plasticized mono-layer PVC films, building up a multi-layer film is required.

The thicker the overall film is and/or the smaller the desired migration value boundary, the more film layers are required. The combination that consists of plasticizers and additives of the individual layers and also the layer design of the overall film is thus becoming increasingly more complex and complicated.

A first aspect of this invention relates to a method for the production of a co-extruded plasticized multi-layer PVC packaging film that consists of polyvinyl chloride (PVC), a combination that consists of polyvinyl chloride (PVC) and polyvinylidene chloride (PVDC) or other PVC-co-polymerizable thermoplastics or elastomers with the same thickness compared to plasticized mono-layer PVC films but with reduced migration of plasticizers out of the film. The method comprises the steps:

Preparation of at least one melt that consists of polyvinyl chloride (PVC), a combination that consists of polyvinyl chloride (PVC) and polyvinylidene chloride (PVDC) or other PVC-co-polymerizable thermoplastics or elastomers, as well as one or more polymer plasticizer(s) and/or monomer plasticizer(s), Generation of a plasticized multi-layer PVC film from at least two film layers by co-extrusion of the melt(s) that consist(s) of polyvinyl chloride (PVC), polyvinylidene chloride (PVDC), a combination that consists of polyvinyl chloride (PVC) and polyvinylidene chloride (PVDC) or other PVC-co-polymerizable thermoplastics or elastomers and one or more polymer plasticizer(s) and/or monomer plasticizer(s), whereby the overall migration of the plasticizers from the composite of the film corresponds to no more than 40 $mg/dm^2$.

The product according to the invention matches a plasticized PVC film with several layers, which can have various concentrations and qualities of plasticizers and/or optionally additional additives. Preferably, the individual film layers can vary arbitrarily in their thicknesses. In a preferred embodiment, a supporting film layer and at least one adjoining film layer are co-extruded, whereby the supporting film layer has a greater layer thickness than that of the at least one adjoining film layer.

Preferably, all co-extruded film layers of the plasticized multi-layer PVC film are co-extruded in approximately the same layer thickness. Preferably, a supporting, preferably a central, film layer and multiple outer film layers are co-extruded, whereby the thickness of the film layers decreases from the inside to the outside for the side that faces the packaged material. The reduction is done preferably in steps. In addition, alternating or varying layer thicknesses are also possible. Also, the type and concentration of plasticizers in one, several, or all layers can turn out to be low or high to varying degrees. As plasticizers, for example, esters from long-chain alcohols with multivalent acids are suitable.

In a preferred variant, the concentration of plasticizers in the layers that face the packaged material is lower than the concentration in a layer that faces away from the packaged material. Preferably, plasticizers are added to one or more arbitrary film layer(s), which plasticizers have a lower or higher migration behavior than the plasticizer(s) of one, several or all other film layer(s).

In other variant embodiments, plasticized PVC films that have up to 13 layers are co-extruded. Preferably, one or more migration barrier layer(s) are provided, which layers either inhibit or reduce the migration of plasticizers from the film composite to the surface of the film or into the packaged product. Preferably, the migration barrier layer contains substances that bind the plasticizers, or the migration barrier layer contains plasticizers that migrate little and that for their part inhibit the plasticizer migration from other film layers through the barrier layer and thus prevent a migration outward into the packaged product (e.g. a fatty food).

This invention makes possible the production of a plasticized multi-layer PVC packaging film, which despite higher overall thickness has low migration values similar to a thinner plasticized mono-layer PVC film with equal or similar total amount of plasticizer in percent by weight. Preferably, the overall migration is no more than 10 $mg/dm^2$ of film, preferably no more than 5 $mg/dm^2$ of film, and the specific migration is no more than 3 $mg/dm^2$. As a result, a correction factor or reduction factor of 1 is obtained. The film according to the invention is economical and considerably more attractive for the manufacturer and customers, technically considerably more efficient and/or generally more universally applicable than a comparable plasticized mono-extruded PVC packaging film.

By the use of co-extrusion, moreover, greater overall film thicknesses with lower migration values can be achieved economically and technically more reasonable than it is the case with conventional mono-extrusion methods. According to the invention, it is therefore provided that at least two film layers are generated by co-extrusion of plasticized polyvinyl chloride (PVC), polyvinylidene chloride (PVDC), a combination that consists of polyvinyl chloride (PVC) and polyvinylidene chloride (PVDC) or other PVC-co-polymerizable thermoplastics or elastomers. The boundary layer(s) that occur in this case can have slightly migration-inhibiting retention properties for the plasticizers, so that the exiting of plasticizers from the film layer(s), which have no direct contact with the packaged product or food, is slowed down, and the overall migration of the plasticizers from the film composite to the surface and thus potentially into a food that is to be packaged is thus reduced not decisively but in a supportive manner under otherwise identical conditions.

In a first variant, one or more plasticized PVC mixture(s) is/are heated to the melting point for co-extrusion and extruded through a multi-layer flat cast die or a multi-layer blown film die with multiple nozzles, corresponding to the number of layers, and then combined immediately thereafter. For this purpose, a co-extrusion equipment is used, which comprises, i.a., one or more screw extruder(s), a multi-layer blown film extruder die or a multi-layer cast film extruder die, a cooling system (e.g., a cooling roll or a cooling ring) as well as a winder.

The number of screw extruders required for the plasticization of the material depends on the number of film layers and on the number of the different formulation compositions of the individual layers. In one variant embodiment, the number of screw extruders corresponds to the number of film layers. In an alternative embodiment, the number of screw extruders deviates, since the formulation of some layers can be identical. In preferred variant embodiments, even several or all layers have the same formulation, so that the number of screw extruders is smaller than those of the film layers, or that only one screw extruder is used.

According to the invention, the co-extrusion method has the advantage that if necessary, multiple layers can be formed, which can have various types and/or concentrations of plasticizers. The co-extruded plasticized PVC films produced according to the invention have a thickness of up to 120μ, preferably between 5μ and 120, preferably between 5μ and 25μ. They are in general not restricted in thickness, however. Also, intermediate values or intermediate ranges of these thicknesses are comprised by the invention.

The design of the co-extruded film according to the invention makes possible considerably lower product costs for the production of the plasticized PVC packaging film according to the invention, since the film thickness can be reduced for one and the same application in the case of similar, uniform or even improved technical film properties and film qualities in comparison to plasticized mono-layer PVC films. In addition, the multi-layer film design offers more latitude in the selection of components for the composition of the individual layers and thus also the possibility in addition to the migration reduction to also reduce the material costs.

According to the invention, the method for the production of the co-extruded plasticized multi-layer PVC packaging film that consists of PVC or a combination that consists of PVC and PVDC or other PVC-co-polymerizable thermoplastics or elastomers according to the invention comprises in a first method step a mixing and melting of raw materials and adjuvants (powder or granulates that consist of PVC, PVDC or derivatives thereof, plasticizers and other additives) and an extrusion of the mixture to form granulates by means of a pelletizer for further processing. The pelletizer has the function to melt, to mix and to extrude directly raw materials and adjuvants (e.g., PVC powder, plasticizers, additives such as waxes, oils and acids) to thus cut granulates directly. These granulates are melted again according to the invention in the second step in the film extruder and extruded to form the plasticized PVC film according to the invention.

Preferably, the extrusion temperature in the case of the film extrusion is between 150° C. and 180° C. Depending on the variant embodiment, a melting of the previously-extruded granulates or a direct mixing and melting of raw materials and subsequent extrusion of the film is carried out. The co-extruded plasticized PVC film is then cooled.

If necessary, various compositions of individual or multiple film layers by using multiple screw extruders are used. Preferably, if necessary or if possible, a perforation, a needle punching and/or printing is done before the cutting process and the winding of the film. Preferably, cutting to format and, immediately thereafter, winding are done. Depending on the embodiment, the winding can be carried out on one side or two sides after trimming and cutting. Preferably, the speed of a PVC-blown-film extruder (extrusion and winding speed) is approximately 90 meters to 400 meters per minute dependent on the design of the co-extrusion equipment, the options for cooling (technical capabilities of the cooling roll and distance to the winder in cast-film extrusion as well as technical capabilities of the cooling and height of the cooling tower in blown-film extrusion), the overall thickness, and the composition of the film. At the same time, intermediate values or intermediate ranges in the above-mentioned speed range are also included. Based on the technology and also the technical progress, a speed of more than 400 meters per minute may be possible.

In a preferred variant embodiment, in the film composition, one or more of the following components are used in addition to polyvinyl chloride (PVC), a combination that consists of PVC and PVDC or other PVC-co-polymerizable thermoplastics or elastomers:

Monomer plasticizers and/or polymer plasticizers
Antioxidants
Anti-acid agents (antacids)
Anti-fog
Processing adjuvant (processing aid)—e.g., PE Wax
Lubricant (slip agent)
Oils, fatty acids
UV stabilizers and/or other adjuvants and additives Preferred thermoplastics, also called plastomers, used in this invention are, for example, polyethylene (PE), polypropylene (PP), polyamide (PA), polycarbonates (PC), polyester, polyethylene terephthalate (PET), polystyrene (PS), polyvinyl chloride (PVC), polyvinylidene chloride (PVDC), polyvinyl acetate (PVAC), and polyvinylidene fluoride (PVDF). Preferred elastomers are, for example, ethylene-vinyl acetate (EVA) and polyvinyl butyral (PVB). The above-cited thermoplastics and elastomers are only examples and can be supplemented with others. The invention is not limited solely to the above-cited thermoplastics and elastomers.

As PVC-co-polymerizable thermoplastics and elastomers, PVDC, PVAC, PVDF, EVA and PVB are to be emphasized as preferred variants; however, the use according to the invention is not restricted solely to the latter. Also, other co-polymerizates are also comprised by the invention, if the latter are technically feasible and rational.

The co-extruded multi-layer film according to the invention comprises at least two film layers, whereby microscopically small gaps form in the boundary layers that occur between the film layers, which gaps can have a slightly inhibiting effect on the migration of plasticizers. The latter, however, are not the essence, purpose or result of the plasticized multi-layer PVC films according to the invention.

Preferably, the film layer that comes into contact with the packaged product takes on a thinner shape in its film thickness than the other film layer(s). The other layer(s) can—depending on the variant embodiment—be thicker starting from the packaged product to the outside layer, but this does not have to be the case. Preferably, the layer thickness of the layer(s) that come into contact with the product is ≤1.5µ. The overall thickness of a plasticized multi-layer PVC film is preferably between 5µ to 120µ. The thickness of the outer layer and all other layers can arbitrarily vary to be combined, however, based on the overall thickness of the film, the respective composition of the film layers, the desired/necessary result relative to the migration and the machinability, and also the technical options of the production unit. With this film and layer design, the overall migration (and, if relevant, also the specific migration) of plasticizers from the film layer system can be controlled and reduced considerably.

The layer quantity in a preferred variant of a film layer system according to the invention is preferably up to 13 layers, preferably between 2 and 10 layers, or any range in-between. In a further preferred variant, the outermost film layer that, for example, faces a food is not thicker than 1.5µ.

In addition to the layer design, the type and the concentration of the plasticizers that are used in the individual film layers are also an important criterion for inhibiting the migration of the plasticizers from the film. This results in the desirable low migration values and thus in smaller reduction factors, preferably a reduction factor of 1.

In addition to the microscopically small separations or gaps, which form in the case of a co-extruded film between the individual film layers and as a whole can already produce a slight inhibition of the overall migration of the plasticizers, the overall film design primarily has the effect that first the plasticizers migrate from the outermost film layer into the packaged food, and the plasticizers of film layer(s) placed further away from the product—slowed down or disrupted in their migration—begin to migrate through the layer(s)

lying closer to the product. This effect can be enhanced by the use of one or more migration-barrier layer(s) with the polymer plasticizers and as few as possible migration-promoting oil- or fat-containing additives contained therein, by which the undesirable migration of the plasticizers from the film, e.g. into the packaged material, is still further minimized.

As migration-barrier layer(s), adaptations of the formulations of one or more outer layer(s) towards the packaged material or the layer(s) that come(s) or can come into contact with the product are used. In these migration-barrier layers, lower quantity of plasticizers and/or other plasticizers can be used, which tend less to migrate. Also, other migration-inhibiting additives are comprised by the invention and can be used in one or more migration-barrier layer(s).

The migration of plasticizers from the film with uniform overall thickness of the packaging film with an increasing number of layers independently of the composition or formulation of the individual layers can be influenced by the design according to the invention. It is also advantageous that the overall film thickness of co-extruded plasticized PVC packaging films can be kept thinner because of improved properties and quality advantages than in the case of a corresponding mono-extruded plasticized PVC film. Since thinner plasticized PVC packaging films as a whole contain fewer plasticizers at equal or similar plasticizer concentration in percent per weight, the overall migration of plasticizers from the film, e.g. into the packaged food, is less under otherwise identical conditions. Therefore, it is advantageous to use the property and quality advantages of a co-extruded plasticized PVC film for a reduction of the overall film thickness. In addition, it is helpful to configure the outer layer(s) as thin as possible and to use the latter, if necessary, as (a) migration-barrier layer(s). With an increasing number of migration-barrier layers that are located towards the packaged product, smaller and smaller migration of plasticizers from the film, e.g. into a packaged food, can be achieved. In summary, because of the multi-layer film design, a migration of plasticizers from the inner film layer(s) outwards through one or more film layer(s) is inhibited or at least considerably reduced.

In a preferred variant, it is provided that the concentration and the type of plasticizers and other additives can vary in the individual film layers and can be arbitrarily combined in order to achieve the targeted migration result. Preferably, plasticizers and/or additives that have a modest migration behavior or influence migration in an inhibiting way are used in the outer film layers. Preferably, polymer plasticizers are suitable for this purpose. In a preferred variant, these plasticizers are more and more frequently contained in the outer film layer(s), i.e., facing the food or packaged product, but are contained less frequently to not at all in the central film layers or the film layer(s) that are further away from the product.

In a preferred variant, a supporting film layer or (in the case of an even number of layers) the middle layers or individual film layers that face away from the food or the packaged product preferably contain(s) monomer plasticizers in order to keep the product costs lower and to make the film more elastic. In the outer film layers, preferably in the migration-barrier layers, polymer plasticizers are more and more frequently added in order to inhibit the migration. Preferably, more polymer plasticizers are added to the two sides outward than in layers lying further inward. This minimizes the risk that when in use, the plasticized PVC food packaging film will be incorrectly used, for example on the cheese counter (reduction factor up to a maximum of 2 is required) instead of the meat counter (reduction factor of 4 is possible) in the supermarket, and the packaged food will be impermissibly contaminated.

The plasticizer types, plasticizer quantities and their concentrations in mixtures can vary from film layer to film layer and are adapted individually based on the conditions (i.a., overall film thickness, product to be packaged, number of film layers, type of application) and the desired result. Preferably, these concentrations vary between 3% by weight and 35% by weight relative to the overall concentration, preferably between 25% by weight and 35% by weight. In films that must be stretched little or not at all, the plasticizer concentrations can also vary between 3% by weight and 15% by weight. The invention also comprises arbitrary intermediate values or intermediate ranges within these ranges.

Both monomer plasticizers and polymer plasticizers can be used. The individual plasticizers have varying migration behavior and migration values. Polymer plasticizers show a migration rate that is considerably lower than that of monomer plasticizers. Since polymer plasticizers are very expensive, however, and can have a negative impact on the film's technical performance or the machinability as stretch film, a mixture of the two plasticizer groups is always advisable, and an increased use of polymer plasticizers for migration-barrier purposes is useful. In the film layers that are further away from the packaged product, preferably less-migrating monomer plasticizers are to be used. Thus, the film remains elastic, resilient, and affordable for the customer.

Because of the reduction in thickness achieved with the co-extruded plasticized multi-layer PVC film according to the invention, the proportion of plasticizers that can migrate from the packaging film, e.g. into the packaged food, is significantly reduced to the desired value. In addition, a reduction in thickness also has a very positive impact on damage to the environment, since the overall use of PVC films can drop under otherwise identical conditions. Thus, the co-extruded plasticized PVC packaging film according to the invention is suitable for food that promotes the health of the consumers but at the same time also protects the environment. To this is added the fact that the material costs are lower in the case of co-extrusion since reductions in thickness can be achieved with similar or equal quality or even an improvement in quality and the PVC films are economically worthwhile and affordable for customers despite a considerable reduction in migration.

Preferably, the plasticized multi-layer PVC film according to the invention consists of at least two, preferably more than two, co-extruded film layers that consist of polyvinyl chloride (PVC), polyvinylidene chloride (PVDC), a combination that consists of polyvinyl chloride (PVC) and polyvinylidene chloride (PVDC) or other PVC-co-polymerizable thermoplastics or elastomers. In a preferred embodiment, it is also provided that one or more outer film layer(s) is/are designed as migration-barrier layers, which primarily have polymer plasticizers to an increased extent or exclusively. Alternately or supportively, lower quantity of plasticizers can also be used in the migration-barrier layers, which plasticizers can simultaneously have the least migration behavior possible (e.g., polymer plasticizers or lower-migrating monomer plasticizers).

The co-extruded plasticized PVC film according to the invention is suitable as plastic wrap and stretch film for food packaging. However—by varying the overall proportion of the plasticizer that is used in % by weight and varying the overall film thicknesses up to 120μ—various other applications can also be targeted and carried out with the film according to the invention. Thus, for example, it can be used for vacuum packaging and cover-gas packaging (modified atmosphere packaging—MAP) and for manufacturing purposes (stand-up pouch, pouches in general, bags, semi-finished films such as FFS, etc.) in the food industry.

The co-extruded plasticized PVC film can not only be used as food packaging film and sales packaging where it is in direct contact with the product to be packaged (e.g. food, medicaments, textiles or other consumer items). It can also be used for re-packaging and as transport packaging.

A co-extruded plasticized PVC film with inhibited migration behavior of plasticizers out of the film composite is also interesting as sales packaging for products with no expiration date, and in particular interesting as transport packaging. Because such goods have very often long transportation routes from the place of production to the final destination for use, they can be exposed to heat impact multiple times and for a prolonged time. Plasticizers tend to migrate or exudate to the surface of the film at high heat. This is mainly influenced by the degree of temperature and the duration of the impact of heat.

This exudation or migration of plasticizers to the film surface does not necessarily contaminate the food or medicament due to the application, but the properties of the film can be changed in a way that it does no longer fulfill its purpose. In addition, the packaged goods are contaminated in the course of exudation or migration of plasticizers to the film surface by an increased impact of heat. On the surface of the packaged product, sticky or slushy residues can remain, the film and/or the packaged product can change its color or the packaged material (e.g. cardboard or textiles) can absorb plasticizers. These are only a few examples of what could happen if plasticizers are exudated from a packaging film or migrate to the film surface. Therefore, the limitation of migration out of the film composite is meaningful also for applications in which the packaged product is in no direct contact with a food or in which no food or medicament is packaged at all.

Examples of transport packages are palette wrapping stretch films, stretch hood films and shrink hood films. Examples for outer (secondary) packages are collation shrinking films, bags, flat films, tubular films and half tubular films. Other films according to the invention that are not mentioned are also included.

Films or film composites can also be lined or laminated with the plasticized PVC film according to the invention. Preferably, the lined or laminated film is also made of PVC and/or PVDC or a co-polymerizable thermoplastic in order to allow further processing and to contribute significantly to environmental protection by type purity, since recycling is possible. This is not possible or is possible only at considerably higher expense using special technologies (such as, for example, "Vinyloop from Solvay") with previously usual composites of PVDC or PVC with EVA and other polymers (such as, for example, PE or PP). The option of further lamination, lining and/or manufacturing makes the co-extruded plasticized PVC film inter alia universally usable in the food packaging field and opens up many new options for product development and modifications, since PVC and PVDC have very good technical properties and can be very greatly altered by the quality and quantity of additives and can be matched to the respective applications. The term "packaging film" that is used here comprises all of these applications.

The herein used terms "film" or "film composite" refers to a co-extruded packaging film as a whole according to the invention. Pure mono-extruded films and single film layers within the co-extruded packaging film will be named explicitly herein as such.

METHODS FOR EXECUTING THE INVENTION AND INDUSTRIAL APPLICABILITY

The invention is explained in the examples below.

FIGS. 1 to 3 show various multi-layer systems of plasticized PVC packaging films with various layer designs and various layer thicknesses.

FIG. 1 provides a supporting central film layer that consists of monomer plasticizers. Several migration-barrier layers with polymer plasticizers and/or monomer plasticizers are designed to be adjoining. The film thickness of the central film layer is 8μ in the example shown; the film thicknesses of the outer film layers are in each case 1μ. Separations or gaps, which are referred to as layer separations/seams, are formed between the individual film layers and can to a small extent help inhibit the migration of plasticizers from inside to outside.

A seven-layer design with an overall film thickness of 14μ is shown.

In FIG. 2, another example is shown, whereby the film layers vary between 1 and 4μ. The outer film layers have a lower concentration of plasticizers than the film layers that are placed centrally or that are further away from the product. A seven-layer design with a 12μ overall film thickness and a one-sided migration inhibition (into the packaged product or food) is shown.

In FIG. 3, a multi-layer plasticized PVC packaging film with a three-layer design is shown, whereby the overall film thickness is 8μ. Here, the outer layers, as migration-barrier layers, are provided with polymer plasticizers, and the middle supporting layer contains a mixture that consists of monomer plasticizers and polymer plasticizers.

A similar example is also shown in FIG. 4, in which the overall film thickness of 10μ is shown in a five-layer design. Also, here, the outside layers, as migration-barrier layers, are provided with polymer plasticizers, and in the layers 2 and 4, the concentration of the monomer plasticizers and/or polymer plasticizers that are used is smaller than the concentration in the supporting film layer (middle layer), which consists of monomer plasticizers and/or polymer plasticizers. Preferably, the same monomer plasticizers and/or polymer plasticizers are used. However, different polymer plasticizers or blockade substances that produce an inhibition of migration can also be used in the individual film layers.

In FIG. 5, a multi-layer plasticized PVC packaging film is shown in the example of a three-layer design with an overall layer thickness of 7μ. The supporting film layer contains only monomer plasticizers and has a thickness of 4μ; the adjoining outer film layers contain only polymer plasticizers and in each case have a thickness of 1.5μ.

In FIG. 6, a plasticized PVC packaging film that consists of a 9-layer design is shown. The overall layer thickness is 16μ. A supporting central film layer consists of monomer plasticizers; the outer film layers have a lower concentration of plasticizers. Moreover, the layers 2 and 8 are provided as migration-barrier layers. The concentrations and types of plasticizers in the individual layers vary.

In FIG. 7, the migration-barrier layer with polymer plasticizers is the outer layer that faces the packaging material.

Figure 8:
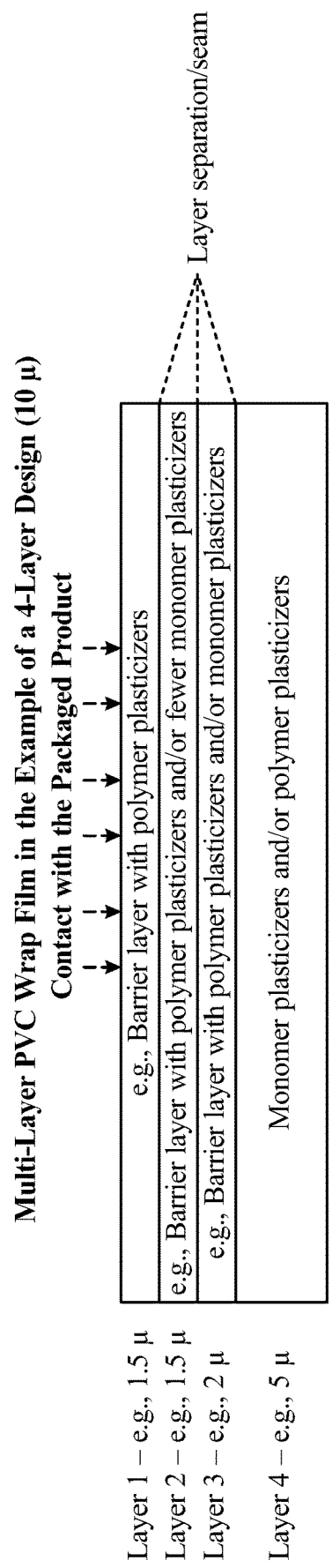

In FIG. 8, a variant embodiment is shown, in which multiple migration-barrier layers are provided, on which the sides that face the packaging material are located. In this case, the concentrations and types of plasticizers vary in the individual layers.

Figure 9:
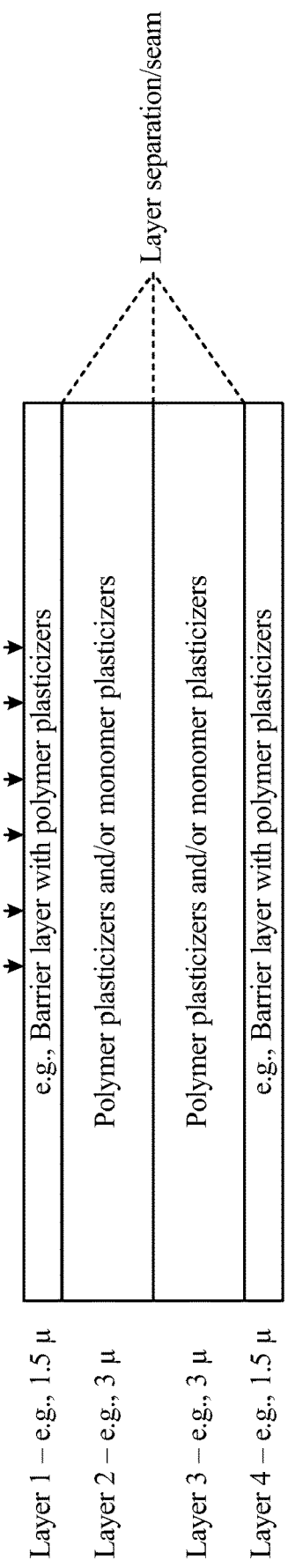
Figure 10:
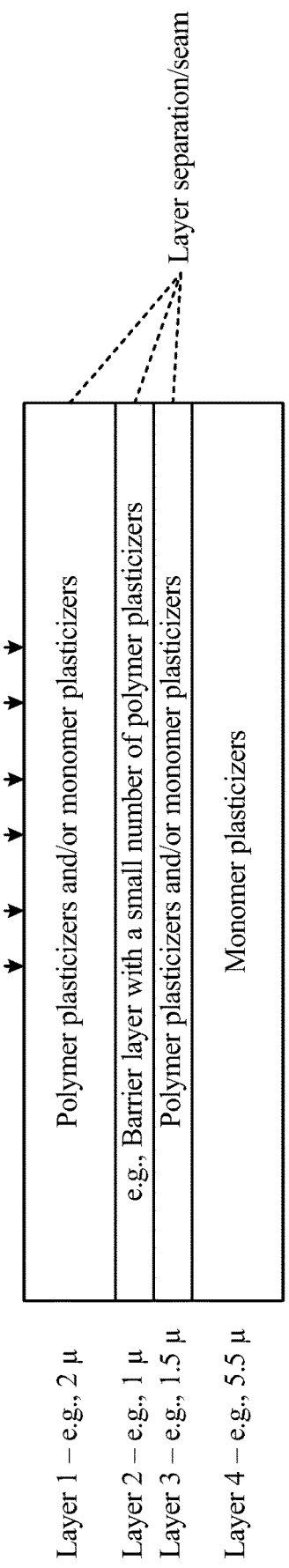
Figure 11:
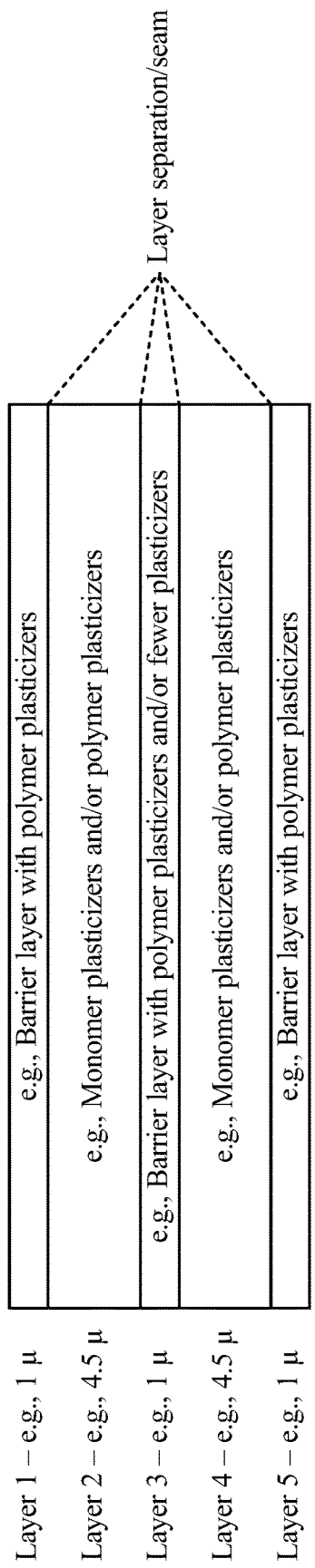

In FIGS. 9 to 11, other variants are shown, in which the layer thicknesses and number of individual film layers, their composition, as well as the number and arrangement of migration-barrier layers vary corresponding to the previously-mentioned examples. In this case, FIGS. 9 and 10 show examples with an even number of layers.

Figure 12:
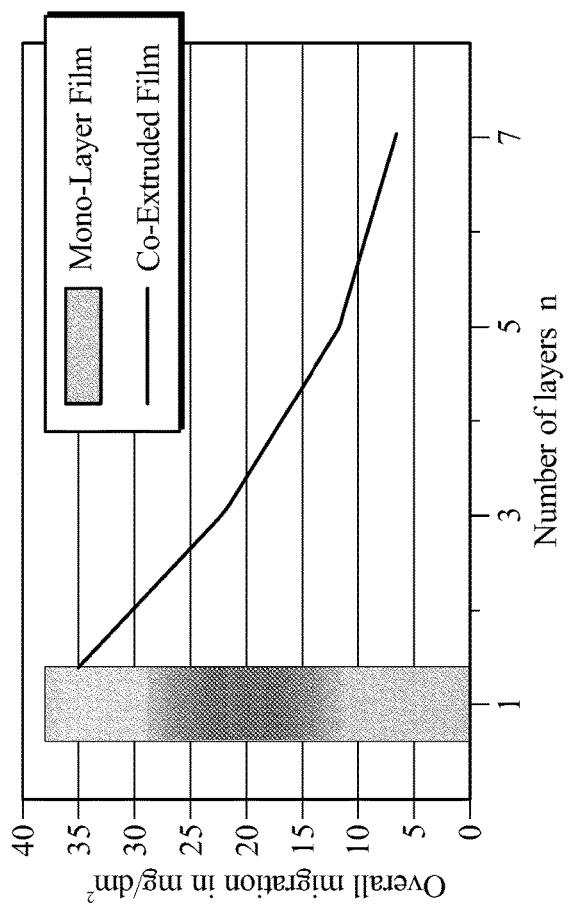

FIG. 12 shows a comparison example in which the migration values of the plasticized multi-layer PVC film according to the invention was depicted in diagram form in comparison to a mono-layer plasticized PVC film of same strength (14 my). It can be seen clearly that the overall migration into a packaged food (example here: meat) was reduced by the multi-layer design and the co-extrusion that was carried out. It is explained in particular that it provides a multi-layer design, and migration-barrier layers are formed, which layers inhibit the migration of the plasticizer from the middle of the film into the packaged material. The migration can be further decreased by the thickness of the film layers or the concentration of the plasticizers being varied in the individual layers. Further, the selection and the proportion of plasticizers are also decisive for individual film layers, whereby, for example, only monomer plasticizers are admixed with certain film layers, in turn polymer plasticizers are admixed with other layers, and a mixture that consists of monomer plasticizers and polymer plasticizers is admixed with other layers within the framework of co-extrusion.

Depending on the application, the overall thickness of the film, the thicknesses of the individual layers, and also their formulations as well the number of layers within the framework of technical feasibility can arbitrarily vary and help minimize migration of plasticizer from the film, so that numerous options result for achieving, by variation and combination, the desired migration result for the respective application and also for enabling/taking advantage of cost-reduction potentials.

The invention claimed is:

1. A co-extruded plasticized multi-layer PVC packaging film, consisting of
a first supporting plasticized PVC film layer of polyvinyl chloride (PVC), with one or more polymer plasticizers and/or one or more monomer plasticizers, and
at least two additional co-extruded plasticized PVC film layers of polyvinyl chloride (PVC) with one or more polymer plasticizers and/or one or more monomer plasticizers, whereby at least one of the at least two additional co-extruded plasticized PVC film layers adjoin the supporting plasticized PVC film layer,
wherein the multi-layer film has an overall layer thickness between 5 μm and 25 μm and wherein the outer film layers of said multi-layer PVC food packaging film have a lower concentration of the one or more polymer plasticizers and/or one or more monomer plasticizers than the layers that are placed centrally, and
wherein the thickness of the PVC film layers of said multi-layer PVC packaging film varies between 1 and 4 μm.

2. A method for the production of the co-extruded plasticized multi-layer PVC packaging film according to claim 1 comprising the steps:
Preparing at least one melt that consists of polyvinyl chloride (PVC) and one or more polymer plasticizer(s) and/or monomer plasticizer(s),
Generating the multi-layer plasticized PVC film according to claim 1 from at least three film layers by co-extrusion of the melt(s) that consist(s) of polyvinyl chloride (PVC and one or more polymer plasticizer(s) and/or monomer plasticizer(s).

3. The method according to claim 2, wherein at least one supporting film layer and at least one adjoining film layer are co-extruded, whereby the supporting film layer has a greater layer thickness than the at least one adjoining film layer.

4. The method according to claim 2, wherein all co-extruded film layers of the multi-layer film are co-extruded approximately with the same layer thickness.

5. The method according to claim 2, wherein raw materials are mixed and melted at an extrusion temperature of 150° C. to 180° C. and co-extrusion and winding of the PVC film are carried out at a speed of 90 to 400 meters per minute.

* * * * *